(12) United States Patent
Mori et al.

(10) Patent No.: US 8,760,019 B2
(45) Date of Patent: Jun. 24, 2014

(54) ROTATING ELECTRIC MACHINE TERMINAL ARRANGEMENT

(75) Inventors: Yoshimi Mori, Mito (JP); Toshiaki Ueda, Naka (JP); Takahiro Ohmori, Hitachi (JP); Kohei Ichikawa, Nishio (JP); Kenichi Nakayama, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 413 days.

(21) Appl. No.: 12/826,408

(22) Filed: Jun. 29, 2010

(65) Prior Publication Data

US 2011/0001373 A1 Jan. 6, 2011

(30) Foreign Application Priority Data

Jun. 30, 2009 (JP) ................... 2009-154527

(51) Int. Cl.
*H02K 1/00* (2006.01)
*H02K 11/00* (2006.01)

(52) U.S. Cl.
USPC ............................................. 310/71; 310/184

(58) Field of Classification Search
CPC ........................................................ H02K 5/225
USPC .................................................. 310/71, 184
See application file for complete search history.

(56) References Cited

U.S. PATENT DOCUMENTS

| | | | | |
|---|---|---|---|---|
| 5,508,571 | A * | 4/1996 | Shafer, Jr. ....................... | 310/71 |
| 6,208,061 | B1 * | 3/2001 | An ............................... | 310/254.1 |
| 6,417,592 | B2 * | 7/2002 | Nakamura et al. ............ | 310/184 |
| 6,791,228 | B2 * | 9/2004 | Hashiba et al. ................ | 310/201 |
| 7,145,273 | B2 * | 12/2006 | Even et al. ....................... | 310/71 |
| 7,170,210 | B2 * | 1/2007 | Even et al. ..................... | 310/201 |
| 7,417,351 | B2 * | 8/2008 | Mori et al. ..................... | 310/184 |

FOREIGN PATENT DOCUMENTS

| | | |
|---|---|---|
| JP | 2001-169490 A | 6/2001 |
| JP | 2002-218689 A | 8/2002 |

OTHER PUBLICATIONS

Machine Translation, JP 2002218689 A, Aug. 2, 2002.*
Japanese Office Action including English language translation dated Nov. 8, 2011 (Six (6) pages).

* cited by examiner

*Primary Examiner* — John K Kim
*Assistant Examiner* — Thomas Truong
(74) *Attorney, Agent, or Firm* — Crowell & Moring LLP

(57) ABSTRACT

A rotating electric machine includes a rotor and a stator. The stator coil of the stator includes a set of a first stator coil and a second stator coil that is stored in an adjacent slot to a slot in which the first stator coil is stored, with a number of the set being same as a number of phases, and one end of each of the first stator coil and the second stator coil is a lead section and an other end is a neutral point. A plurality of the stator coils are arranged radially in layers in each slot, and a lead section of the first stator coil and a lead section of the second stator coil are connected with each other with one of the lead sections extending from an outermost layer of the slot and an other of the lead sections extending from an innermost layer of the slot so that the connected lead sections constitute an external connection terminal.

6 Claims, 19 Drawing Sheets

FIG.18

| POLE | | N | | | | | | | S | | | |
|---|---|---|---|---|---|---|---|---|---|---|---|---|
| SLOT NO. | 1 | 2 | 3 | 4 | 5 | 6 | 7 | 8 | 9 | 10 | 11 | 12 | |
| FIRST | W2+ | V1- | V1- | U2+ | U2+ | W1- | W1- | V2+ | V2+ | U1- | U1- | W2+ | OUTER CIRCUIT |
| SECOND | W1+ | V2- | V2- | U1+ | U1+ | W2- | W2- | V1+ | V1+ | U2- | U2- | W1+ | |
| THIRD | V1- | V1- | U2+ | U2+ | W1- | W1- | V2+ | V2+ | U1- | U1- | W2+ | W2+ | INNER CIRCUIT |
| FOURTH | V2- | V2- | U1+ | U1+ | W2- | W2- | V1+ | V1+ | U2- | U2- | W1+ | W1+ | |

ROTATING ELECTRIC MACHINE TERMINAL ARRANGEMENT

INCORPORATION BY REFERENCE

The disclosure of the following priority application is herein incorporated by reference: Japanese Patent Application No. 2009-154527 filed Jun. 30, 2009

BACKGROUND OF THE INVENTION

1. Field of the Invention

The present invention relates to a rotating electric machine and a manufacturing method thereof.

2. Description of Related Art

Japanese Laid Open Patent Publication No. 2002-218689 discloses a rotating electric machine including a stator in which an external-connection-side lead section is disposed by axially extending in the upper part of a stator core and neutral wires are disposed on the both sides thereof.

It is often useful to disperse external-connection-side lead sections of a stator of, for example, a vehicle alternator due to the relationship with commutators. It is preferable, however, to aggregate external-connection-side lead sections of a stator of, for example, an electric vehicle motor into one position so as to connect with cables. It is preferable to narrow raised regions such as neutral wire routing in the upper part of a coil end so as to ensure a gap with a transmission section. With the lead sections being concentrated into one position, it is necessary to adopt a simple structure that ensures isolation between the conductors and high manufacturing workability.

The present invention is to provide a rotating electric machine and a manufacturing method thereof with high insulation and productivity.

SUMMARY OF THE INVENTION

A rotating electric machine according to a first aspect of the present invention comprises: a rotor that comprises a plurality of magnetic poles polarities of which are arranged to alternate circumferentially; and a stator, disposed with respect to the rotor through a rotary gap, that comprises a stator core in which a plurality of slots are formed circumferentially and a stator coil that is stored in the plurality of slots and ranges astride the slots corresponding to the plurality of magnetic poles outside an axial end section of the stator core, wherein: the stator coil comprises a set of a first stator coil and a second stator coil that is stored in an adjacent slot to a slot in which the first stator coil is stored, with a number of the set being same as a number of phases, and one end of each of the first stator coil and the second stator coil is a lead section and an other end is a neutral point; and a plurality of the stator coils are arranged radially in layers in each slot, and a lead section of the first stator coil and a lead section of the second stator coil are connected with each other with one of the lead sections extending from an outermost layer of the slot and an other of the lead sections extending from an innermost layer of the slot so that the connected lead sections constitute an external connection terminal.

According to a second aspect of the present invention, in the rotating electric machine according to the first aspect, the external connection terminal may be disposed in a position perpendicular to an axial direction of the stator core on a circumference of the stator core.

According to third aspect of the present invention, in the rotating electric machine according to the first aspect, the external connection terminals of each phase may be aggregated in a range of a predetermined number of the slots of the stator core arranged circumferentially.

According to a fourth aspect of the present invention, in the rotating electric machine according to the first aspect, a conductor that constitutes the neutral point may extend from a layer between the outermost layer and the innermost layer in the slot.

According to a fifth aspect of the present invention, in the rotating electric machine according to the fourth aspect, it is preferable that a conductor of the first stator coil extends from the slot to one circumferential side to form a neutral point and a conductor of the second stator coil extends from the slot to other circumferential side to form a neutral point, and the neutral points of the first stator coils are connected together and the neutral points of the second stator coils are connected together.

According to a sixth aspect of the present invention, a manufacturing method of the rotating electric machine according to the fifth aspect comprises: setting a length of the conductor that form the neutral point of each phase and molding the conductors in advance so that the neutral points of the conductors of the set length connect with each other in a same position.

BRIEF DESCRIPTION OF THE DRAWINGS

FIG. 18 shows a plan table of each phase of the stator of the rotating electric machine that constitutes an embodiment of the present invention.

DESCRIPTION OF PREFERRED EMBODIMENTS

Figure 1:
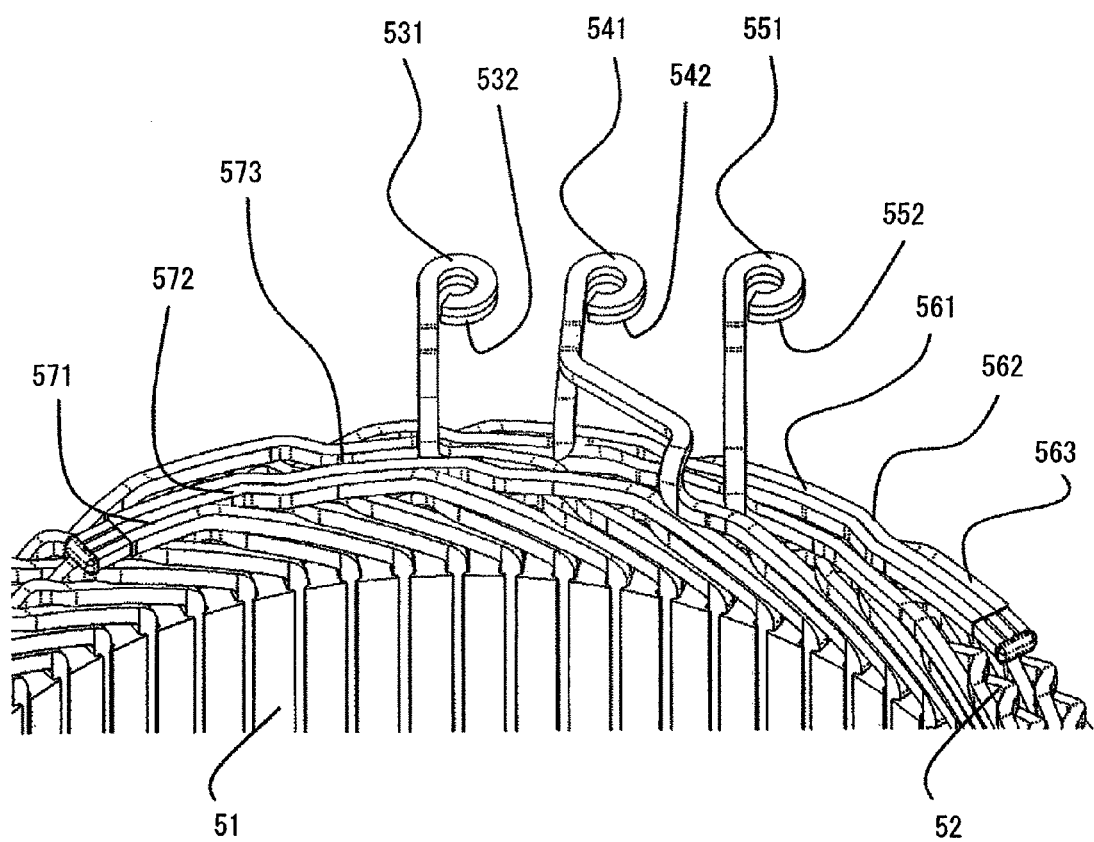
FIG. 1 shows an enlarged view of a lead section of the stator of the rotating electric machine that constitutes an embodiment of the present invention.

An embodiment of the present invention will be explained below. The embodiment explained now is related to the structure of external-connection-side lead sections and neutral wires of a stator of a rotating electric machine.

In the embodiment below, a stator of a rotating electric machine that is easy to manufacture is provided, in which external-connection-side lead sections of the stator are aggregated into one position, raised regions such as neutral wire routing are narrowed, and isolation between the conductors is ensured. The external-connection-side lead sections are aggregated into one position so as to connect with cables, and the raised region such as neutral wire routing in the upper part of a coil end section are reduced so as to ensure a gap with a transmission section. Even with the external-connection-side lead sections being concentrated into one position, a simple structure is achieved to ensure isolation between the conductors and high manufacturing workability.

The rotating electric machine according to the present embodiment is used mainly as an electric vehicle motor. The rotating electric machine according to the present embodiment includes a stator that includes a stator core in which a plurality of slots are formed and a stator coil which is constituted with a plurality of conductors stored in each of the plurality of slots, and a rotor that includes a plurality of magnetic poles disposed so that their polarities alternate in the direction of rotation and that is provided with respect to the stator through a gap. The stator of the rotating electric machine is constituted by electrically connecting a plurality of the conductors disposed in the plurality of the slots and disposed astride a plurality of the slots corresponding to the plurality of magnetic poles. The stator coil is a 2Y distributed winding that a first phase winding includes external-connection-side lead sections and neutral wires and that a coil is wound in a plurality of phases. One of the of two external-connection-side lead sections extends from the innermost slot and the other external-connection-side lead section extends from the outermost slot. These external-connection-side lead sections are paired up to align in a position perpendicular to an axial direction on the circumference of the stator core. This structure allows the external-connection-side lead sections of the stator to be aggregated into one position so as to connect with cables.

The rotating electric machine according to the present embodiment is used mainly as an electric vehicle motor. The rotating electric machine according to the present embodiment includes a stator that includes a stator core in which a plurality of slots are formed and a stator coil which is constituted with a plurality of conductors stored in each of the plurality of slots, and a rotor that includes a plurality of magnetic poles disposed so that their polarities alternate in the direction of rotation and that is provided with respect to the stator through a gap. The stator of the rotating electric machine is constituted by electrically connecting a plurality of the conductors disposed in the plurality of the slots and disposed astride a plurality of the slots corresponding to the plurality of magnetic poles. The stator coil is a 2Y distributed winding that a first phase winding includes external-connection-side lead sections and neutral wires and that a coil is wound in a plurality of phases. One of the two external-connection-side lead sections extends from the innermost slot and the other external-connection-side lead section extends from the outermost slot. These external-connection-side lead sections are paired up. Coupling sections between 2Y windings and neutral wire connection sections are provided in the slot positioned between the innermost slot and the outermost slot, from which the external-connection-side lead sections extend, and the neutral wire connection sections are provided on both sides circumferentially out of the range of the external-connection-side lead sections. This structure allows raised regions such as neutral wire routing in the upper part of a coil end section to be reduced so as to ensure a gap with a transmission section.

The rotating electric machine according to the present embodiment is used mainly as an electric vehicle motor. The rotating electric machine according to the present embodiment includes a stator that includes a stator core in which a plurality of slots are formed and a stator coil which is constituted with a plurality of conductors stored in each of the plurality of slots, and a rotor that includes a plurality of magnetic poles disposed so that their polarities alternate in the direction of rotation and that is provided with respect to the stator through a gap. The stator of the rotating electric machine is constituted by electrically connecting a plurality of the conductors disposed in the plurality of the slots and disposed astride a plurality of the slots corresponding to the plurality of magnetic poles. The stator coil is a 2Y distributed winding that a first phase winding includes external-connection-side lead sections and neutral wires and that a coil is wound in a plurality of phases. One of the two external-connection-side lead sections extends from the innermost slot and the other external-connection-side lead section extends from the outermost slot. These external-connection-side lead sections are paired up. In order to ensure the insulation distance, the neutral wires positioned between the innermost and the outermost slots, from which the external-connection-side lead sections extend, are inserted into slots in a state where the neutral wires are formed in advance with conductors alone so that a set of three neutral wires are connected together. This structure achieves a simple structure that ensures isolation between conductors in view of manufacturing workability even with the external-connection-side lead sections concentrated into one position.

—Embodiment 1—

Figure 3:
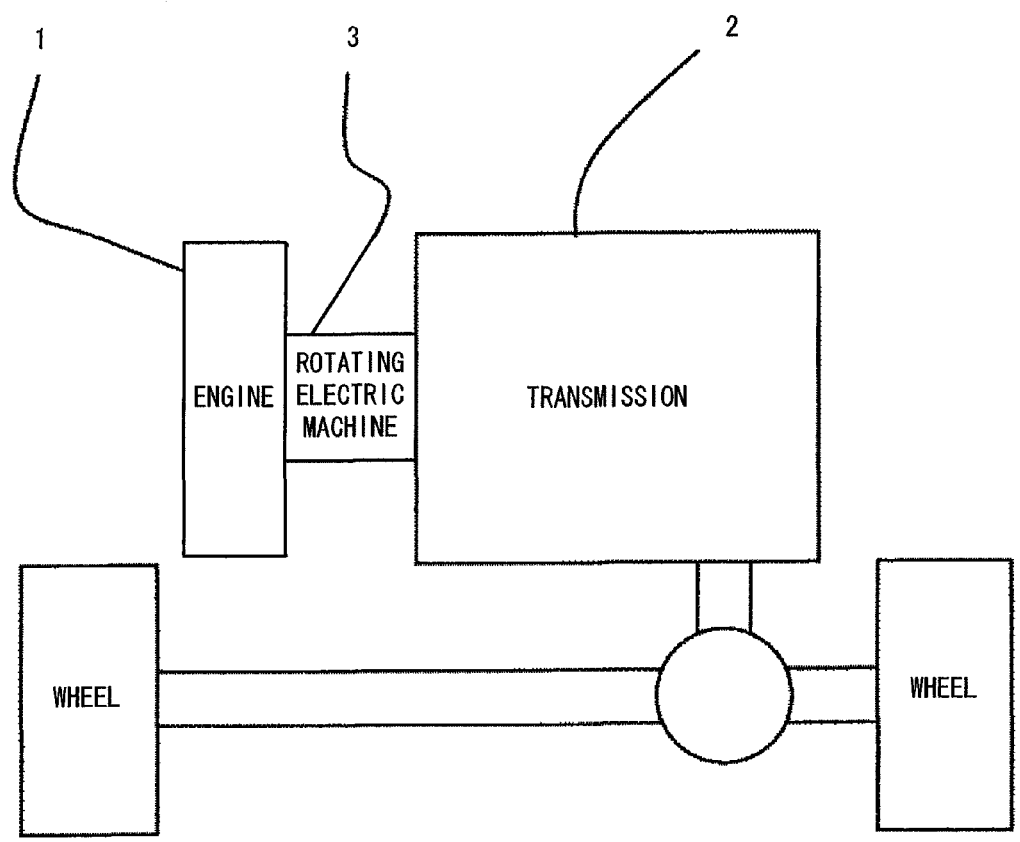
FIG. 3 shows a block diagram of the rotating electric machine according to an embodiment of the present invention mounted on a vehicle.

FIG. 3 shows a block diagram of a rotating electric machine 3 according to the first embodiment of the present invention mounted on a vehicle. The rotating electric machine 3 explained in the present embodiment is, for instance, a motor for hybrid vehicles. The rotating electric machine 3 is mounted between an engine 1 and a transmission 2 or in the transmission 2. The rotating electric machine 3 is required to be small in size and high in output.

Figure 4:
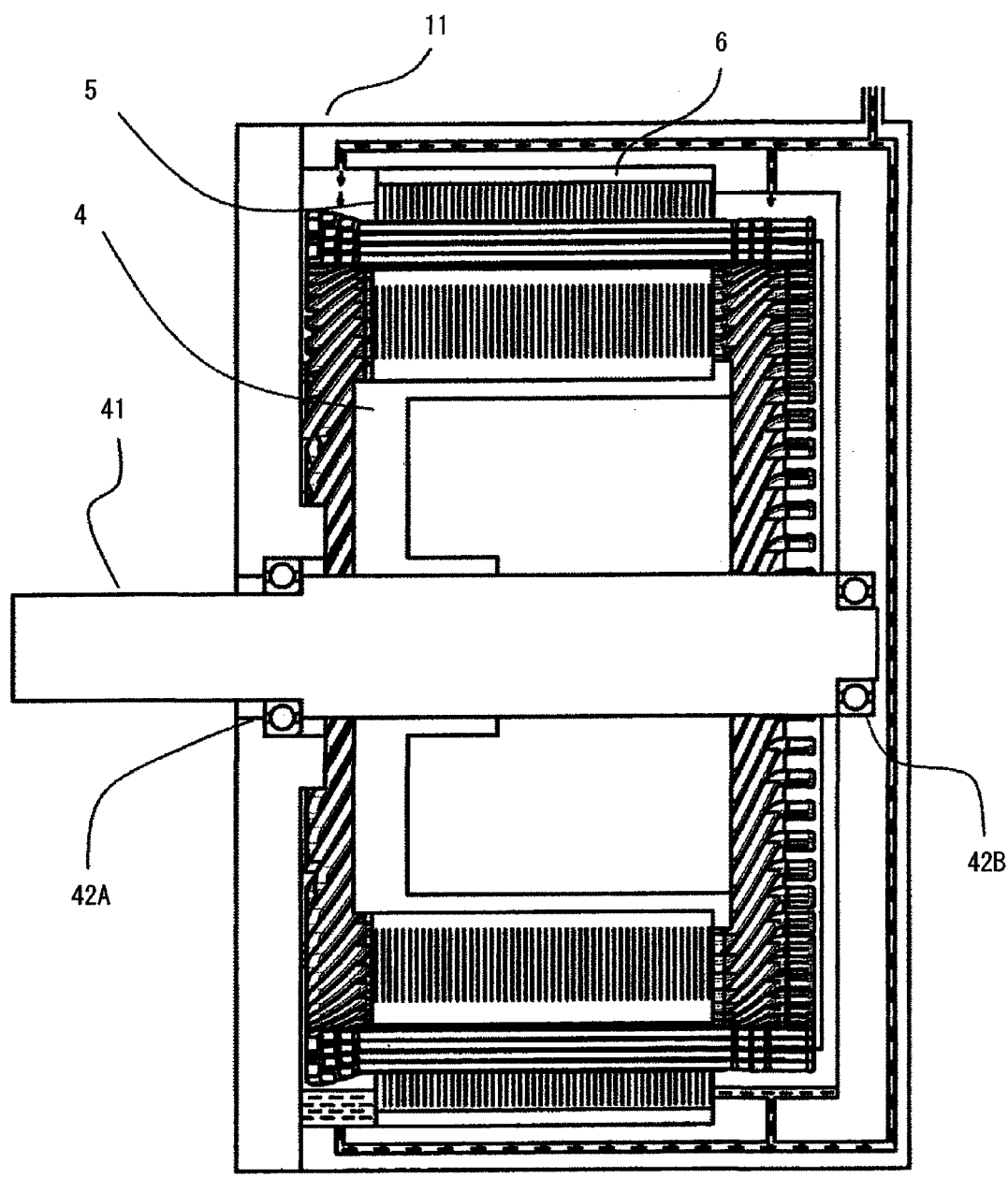
FIG. 4 shows a sectional view of the rotating electric machine that constitutes an embodiment of the present invention.

FIG. 4 shows a sectional view of the rotating electric machine 3. The rotating electric machine 3 is covered with a case 11. If the rotating electric machine 3 is disposed between the engine 1 and the transmission 2, the case 11 is made up of the case of the engine and the case of the transmission. If the rotating electric machine 3 is mounted in the transmission 2, the case 11 is made up of the case of the transmission.

The rotating electric machine 3 includes a rotor 4, a stator 5, and a housing 6. The rotor 4 is disposed inwardly in the stator 5 through a gap. The rotor 4 is fixed to a shaft 41, and both ends of the shaft 41 are rotatably supported by bearings 42A and 42B.

The outer circumference of the stator 5 is fixed to the inner circumference of the housing 6. The outer circumference of the housing 6 is fixed inwardly in the case 11. The rotating electric machine 3, which is a three-phase synchronous motor with a built-in permanent magnet, acts as an electric machine or motor when high (for example, 400A) three-phase alternating current is supplied to the stator 4. When driven by the engine 1, the rotating electric machine 3 acts as a power generator and outputs power of three-phase alternating current. When the rotating electric machine 3 acts as a power generator, the current output from the stator 5 (for instance, 100A) is less than the current used by the rotating electric machine 3 acting as an electric machine. The rotating electric machine 3 presented in the example is a flat rotating electric machine with thickness in the direction of the rotation axis being less than the outside diameter.

Figure 5:
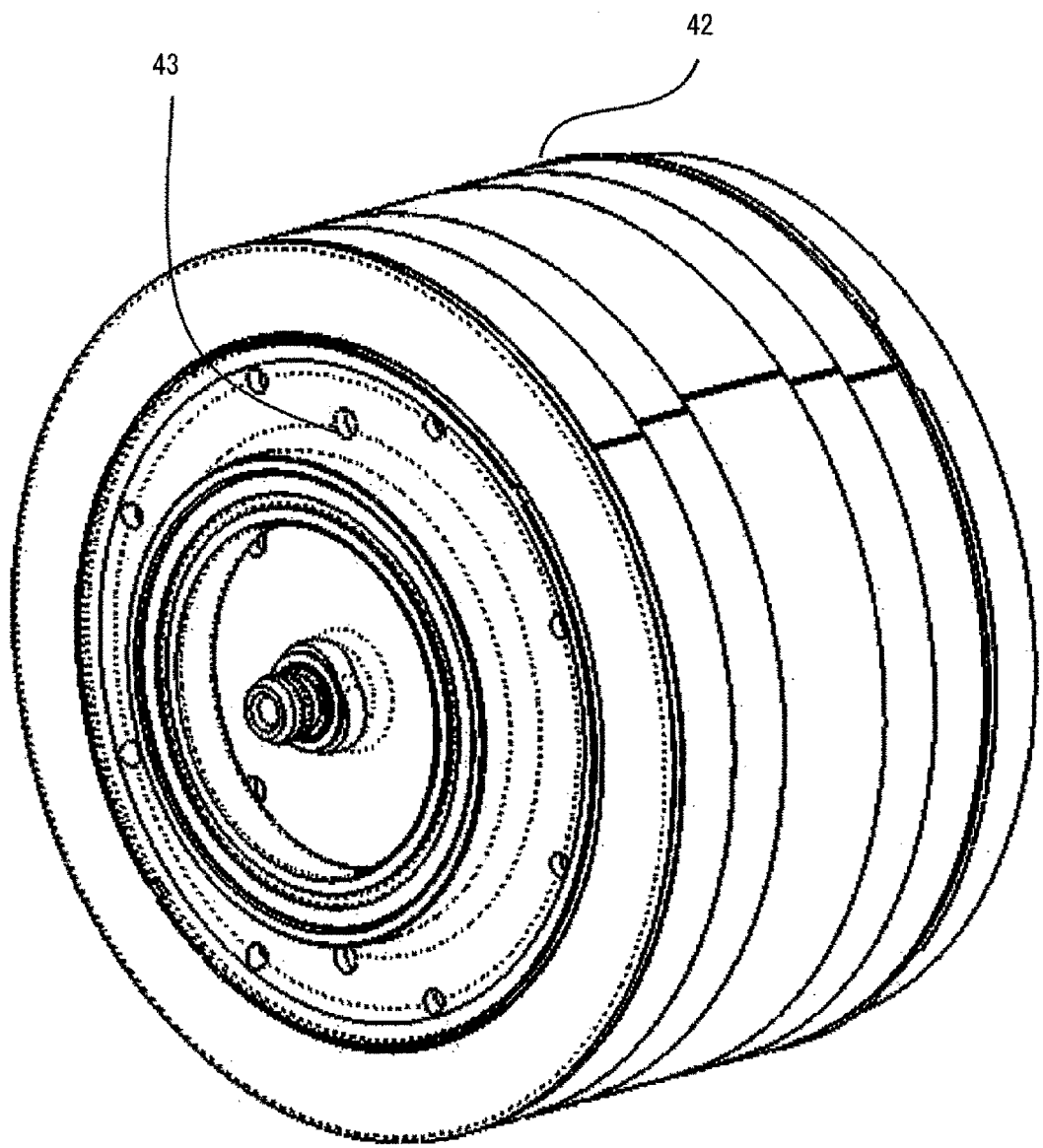
FIG. 5 shows an external view of the rotor of the rotating electric machine that constitutes an embodiment of the present invention.

FIG. 5 shows an external view of the rotor 4 of the rotating electric machine 3. The rotor 4 includes a rotor core 42 and a permanent magnet 43, which is inserted into a hole formed in the rotor core 42. The permanent magnet 43 may assume not one magnet per one pole but the one divided into a plurality of pieces. The rotor 4 includes a plurality of magnetic poles disposed so that their polarities alternate in the direction of rotation.

Figure 6:
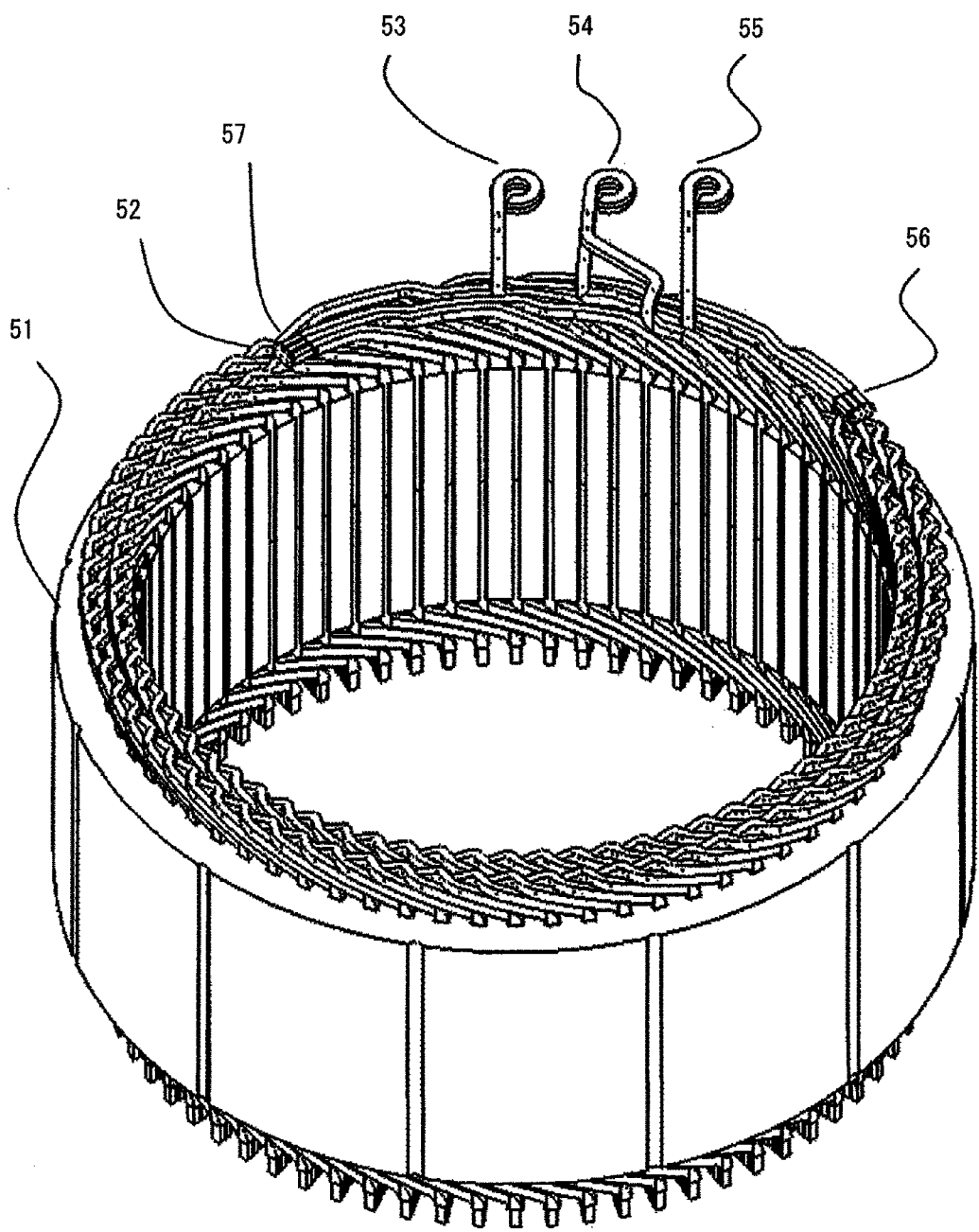
FIG. 6 shows an external view of the stator of the rotating electric machine that constitutes an embodiment of the present invention.

FIG. 6 shows an external view of the stator 5 of the rotating electric machine 3. The stator 5 includes a stator core 51 in which a plurality of slots are formed and a stator coil which is constituted with a plurality of conductors 52 stored in each of the plurality of slots. The rotor 4 includes the plurality of magnetic poles disposed so that their polarities alternate in the direction of rotation and is provided inside the stator 5 through a gap. The stator 5 of the rotating electric machine is constituted by electrically connecting a plurality of the conductors 52 disposed in the slots and disposed astride a plurality of the slots corresponding to the plurality of magnetic poles. The stator 5 includes a U phase lead section 53, a V phase lead section 54, and a W phase lead section 55 to connect a neutral point A56 and a neutral point B57, which are provided in the upper part of the coil end section constituted with the plurality of conductors 52, with an external device.

Figure 7:
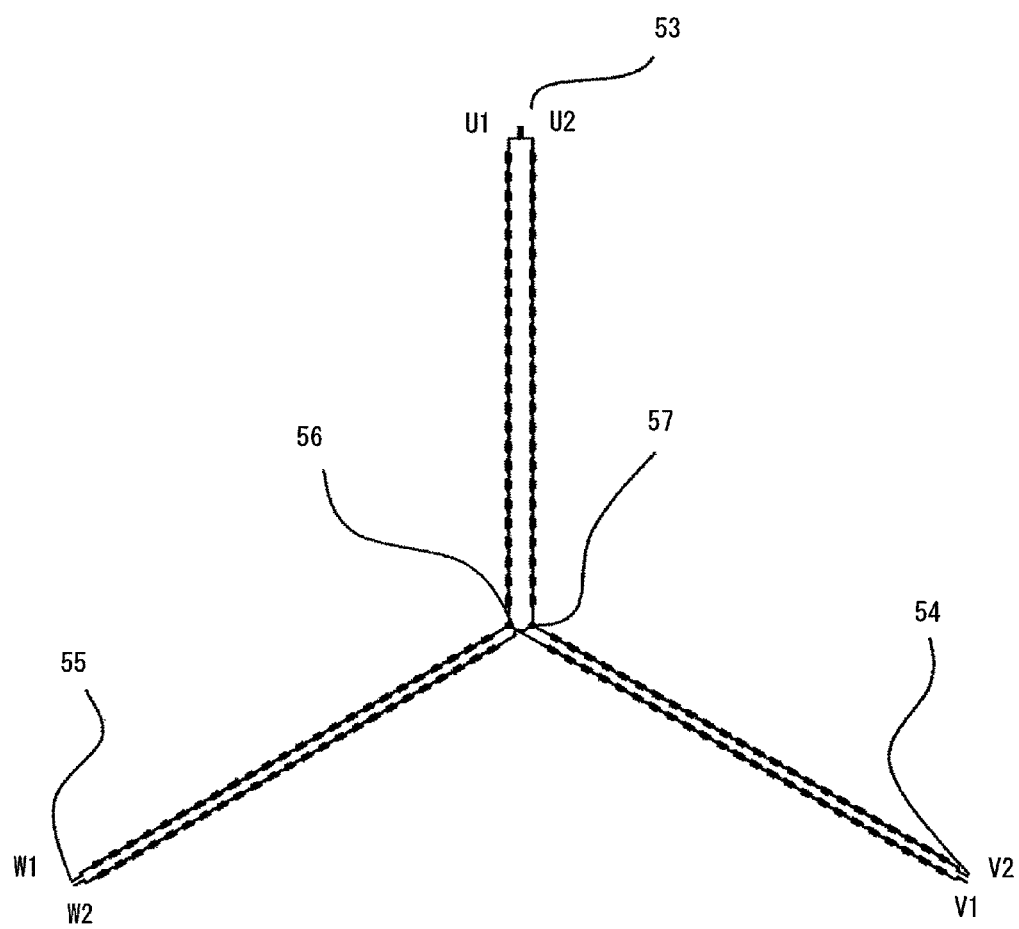
FIG. 7 shows a connection circuit diagram of the stator of the rotating electric machine that constitutes an embodiment of the present invention.

FIG. 7 shows a connection circuit diagram of the stator 5 of the rotating electric machine 3. The stator 5 shown in FIG. 4 includes the U phase lead section 53, the V phase lead section 54, and the W phase lead section 55, which are to be connected with the outside in three-phase connection of 2Y distributed winding, and the neutral point A56 and the neutral point B57.

FIG. 1 shows an enlarged view of a lead section of the stator 5 of the rotating electric machine 3. Mainly, in the case of a stator of a motor for electric vehicles, external-connection-side lead sections are aggregated into one position or location, for instance within a circumferential width of equal to or less than a predetermined number of slots of the stator core, so as to connect with cables. In the case that, for example, three slots are ensured per one phase so as to ensure mutual insulation, the external-connection-side lead sections can be aggregated into nine slots in total, although the number of the slots is not limited to nine.

In the U phase lead section 53 shown in FIG. 6, a U1 phase lead 531, which is extended from the innermost slot of the stator core 51, and a U2 phase lead 532, which is extended from the outermost slot of the stator core 51, are aligned in a position perpendicular to the axial direction on the circumference of the stator core 51. End sections of the U1 phase lead 531 and the U2 phase lead 532 are rounded by detaching coating and the lower surface of the U1 phase lead 531 and the upper surface of the U2 phase lead 532 are closely adhered so as to form a terminal. In the V phase lead section 54 shown in FIG. 6, a V1 phase lead 541 and a V2 phase lead 542 are aligned in a position perpendicular to the axial direction on the circumference of the stator core 51. End sections of the V1 phase lead 541 and the V2 phase lead 542 are rounded by detaching coating and the lower surface of the V1 phase lead 541 and the upper surface of the V2 phase lead 542 are closely adhered so as to form a terminal. In the same manner, in the W phase lead section 55 shown in FIG. 6, a W1 phase lead 551 and a W2 phase lead 552 are aligned in a position perpendicular to the axial direction on the circumference of the stator core 51. End sections of the W1 phase lead 551 and the W2 phase lead 552 are rounded by detaching coating and the lower surface of the W1 phase lead 551 and the upper surface of the W2 phase lead 552 are closely adhered so as to form a terminal. In the U phase lead section 53 of the external-connection-side lead section the U1 phase lead 531 and the U2 phase lead 532 are aligned as a pair, in the V phase lead section 54 the V1 phase lead 541 and the V2 phase lead 542 are aligned as a pair, and in the W phase lead section 55 the W1 phase lead 551 and the W2 phase lead 552 are aligned as a pair, in parallel in a position perpendicular to the axial direction on the circumference of the stator core 51. It is necessary to reduce the raised region of routing of the neutral point A56 and the neutral point B57 shown in FIG. 6 in the upper part of a coil end section so as to ensure a gap with a transmission section. In order to do so, the neutral point A56 shown in FIG. 6 is disposed outside, or at the right side in FIG. 6 of, the W1 phase lead 551 and the W2 phase lead 552 by leading the U1 phase neutral wire 561, the V1 phase neutral wire 562, and the W1 phase neutral wire 563 in the upper part of the coil end section of the plurality of conductors 52. The neutral point B57 shown in FIG. 6 is disposed outside, or at the left side in FIG. 6 of, the U1 phase lead 531 and the U2 phase lead 532 by leading the U2 phase neutral wire 571, the V2 phase neutral wire 572, and the W2 phase neutral wire 573 in the upper part of the coil end section of the plurality of conductors 52.

Figure 2:
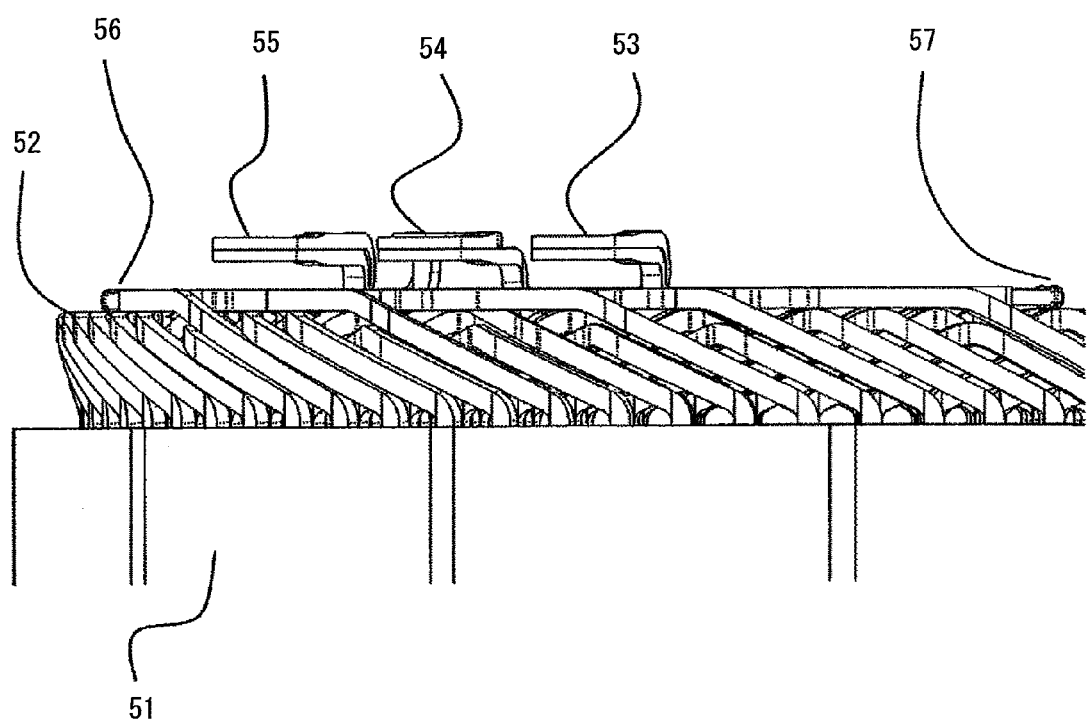
FIG. 2 shows a side view of a lead section of the stator of the rotating electric machine that constitutes an embodiment of the present invention.

FIG. 2 shows a side view of the lead section of the stator 5 of the rotating electric machine 3. The lead sections 53, 54, and 55 for external connection, which are aligned in parallel in a position perpendicular to the axial direction on the circumference of the stator core 51, are aggregated into one position or location so as to connect with cables. The neutral point A56 and the neutral point B57 are disposed in the both sides circumferentially out of the range of the lead sections 53, 54, and 55 for external connection over the coil end section of the plurality of conductors 52 so as to reduce the portion raised by routing or arranging neutral wires.

The plurality of conductors 52 are formed into the final shape in advance so as to ensure insulation between the conductors and are bent at an obtuse angle so as not to apply much pressure on insulation coating.

Figure 8:
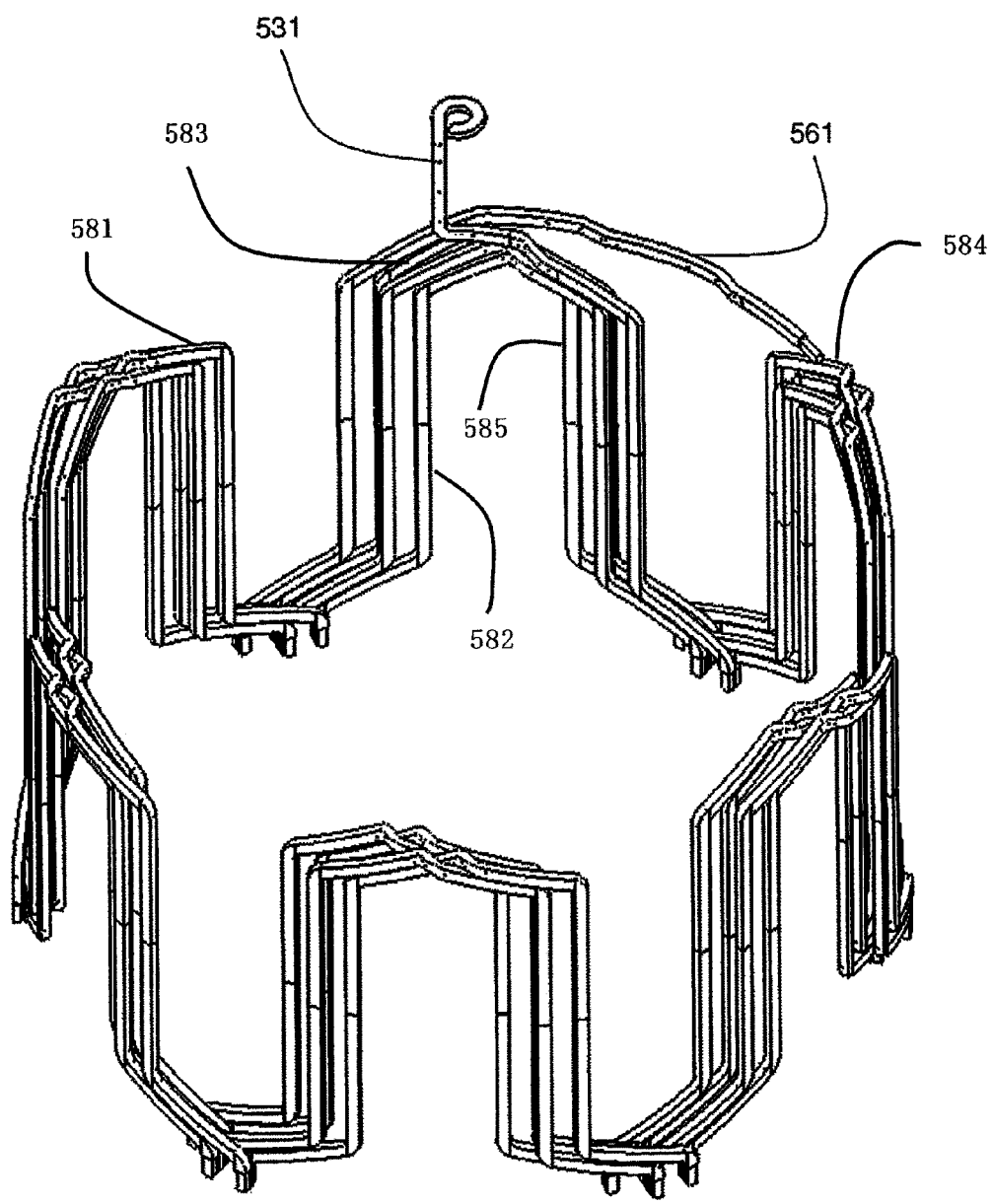
FIG. 8 shows an external view of a U1 phase assembly of the stator that constitutes an embodiment of the present invention.

FIG. 8 shows an external view of a U1 phase assembly of the stator 5. A winding circuit is constituted with 12 magnetic poles, 72 slots, three phases of the stator coil, two slots per phase per pole that is determined by the number of poles, and four conductors per one pole of the magnetic poles, as shown in FIG. 18. In the winding circuit, 12 slots are disposed per two magnetic poles (a pair of magnetic poles of N-pole and S-pole, with different polarities) of the rotor 4. In addition, four conductors are disposed in one slot so that four conductors are arranged per one pole of the magnetic poles in a plurality of slots formed side by side.

Figure 19:
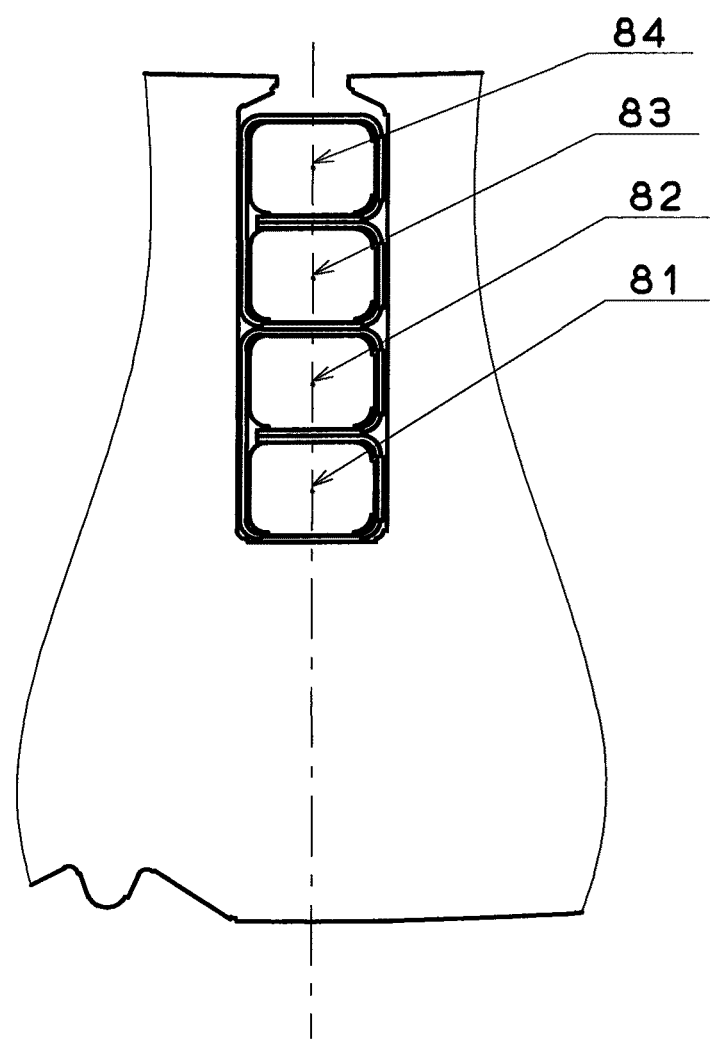
FIG. 19 shows an arrangement in a slot of the stator of the rotating electric machine that constitutes an embodiment of the present invention.

FIG. 19 shows an arrangement in a slot. In this winding circuit, four conductors are radially disposed in a line per one slot, and divided into a set of a first conductor 81 and a second conductor 82, and a set of a third conductor 83 and a fourth conductor 84 from the outer circumference side. The winding circuit is constituted by an inner circuit including the third conductor 83 and the fourth conductor 84 of a plurality of conductors arranged in each of a plurality of slots and an outer circuit including the first conductor 81 and the second conductor 82 of a plurality of conductors arranged in each of a plurality of slots. Thus, the winding circuit is constituted with the four conductors, which are combinations of the two conductors of the inner circuit and the two conductors of the outer circuit. Namely, four layers of conductors are inserted per one slot.

In FIG. 8, the U1 phase has the U1 phase lead 531 as a winding start. The inner circuit is constituted with the third and fourth conductors of the plurality of slots using a conductor 581 striding six slots. However, the conductor 581 interferes with the U1 phase lead 531 at the end of the circuit. Therefore, a conductor with a different slot stride width, i.e., a conductor 582 striding five slots, is used to shift the inner circuit to the adjacent slot on the same layer and then is wound twice so as to move the inner circuit through the second and third conductors of the plurality of slots, i.e., a conductor 583 striding six slots, to the outer circuit. The outer circuit is constituted with the first and second conductors of the plurality of slots, i.e., a conductor of a conductor 584 striding six slots. A conductor with a different slot stride width, i.e., a conductor 585 striding five slots, is used to move the outer circuit to the adjacent slot on the same layer and is wound twice so as to constitute a circuit having the end of winding at the U1 phase neutral wire 561. FIG. 18 shows a plan table of each phase. The U1 phase has the slots No. 3 and 4 into which the two conductors of the inner circuit are inserted and the slots No. 4 and 5 into which the two conductors of the outer circuit are inserted. The conductors of the inner circuit and the outer circuit lie at positions different by one slot, and they become an apparently fractional-pitched winding (winding groove pitch is less than magnetic pole pitch).

Figure 9:
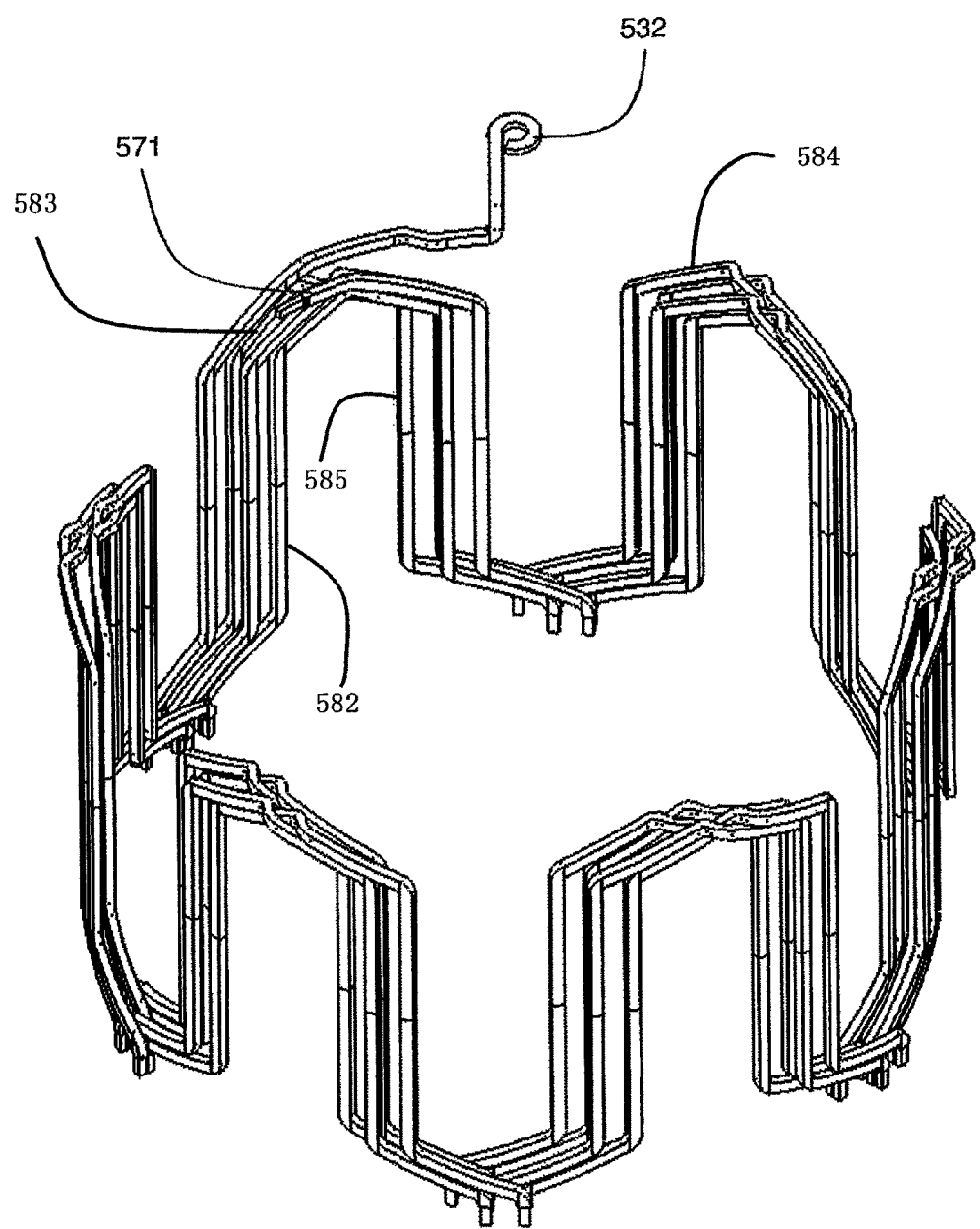
FIG. 9 shows an external view of a U2 phase assembly of the stator that constitutes an embodiment of the present invention.

FIG. 9 shows an external view of a U2 phase assembly of the stator. The U2 phase has the U2 phase lead 532 as a winding start. The outer circuit is constituted with the first and second conductors of the plurality of slots using the conductor 584 striding six slots. However, the conductor 584 interferes with the U2 phase lead 532 at the end of the circuit. Therefore, a conductor with a different slot stride width, i.e., the conductor 585 striding five slots, is used to shift the outer circuit to the adjacent slot on the same layer and then is wound twice so as to move the outer circuit through the second and third conductors of the plurality of slots, i.e., the conductor 583 striding six slots, to the inner circuit. The inner circuit is constituted with the third and fourth conductors of the plurality of slots, i.e., the conductor of a conductor 581 striding six slots. A conductor with a different slot stride width, i.e., the conductor 582 striding five slots, is used to move the inner circuit to the adjacent slot on the same layer and is wound twice so as to constitute a circuit having the end of winding at the U2 phase neutral wire 571. FIG. 18 shows a plan table of each phase. The U2 phase has the slots No. 3 and 4 into which the two conductors of the inner circuit are inserted and the slots No. 4 and 5 into which the two conductors of the outer circuit are inserted. The conductors of the inner circuit and the outer circuit lie at positions different by one slot, and they become an apparently fractional-pitched winding.

Figure 10:
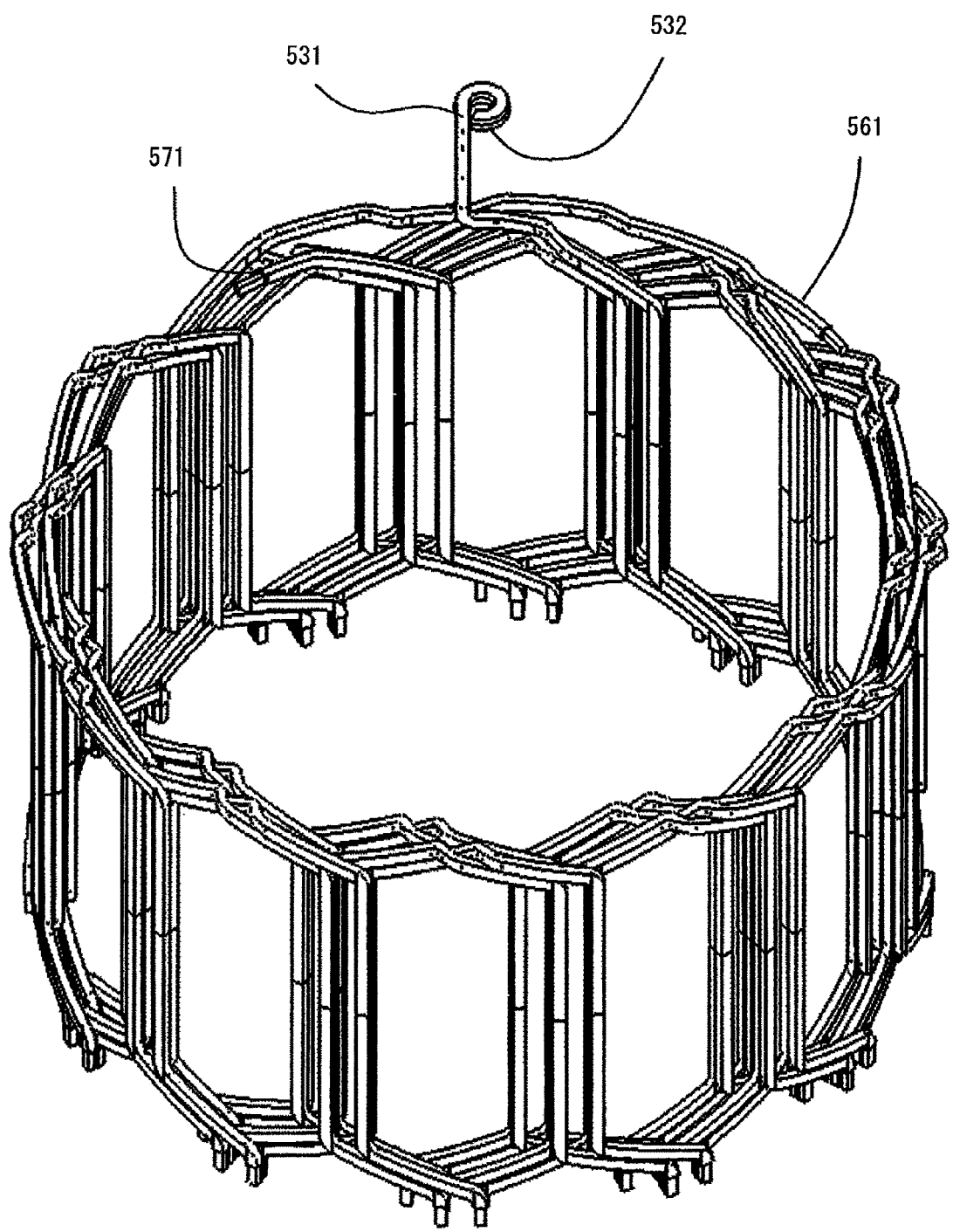
FIG. 10 shows an external view of a U phase assembly of the stator that constitutes an embodiment of the present invention.

FIG. 10 shows an external view of a U phase assembly of the stator, which is an assembly of the U1 phase shown in FIG. 8 and the U2 phase shown in FIG. 9. The U1 phase lead 531 and the U2 phase lead 532 are aligned in a position perpendicular to the axial direction, and the U1 phase neutral wire 561 and the U2 phase neutral wire 571 are disposed in the circumferentially outwardly opposite direction. In the same manner, although the shapes of the phase lead and the phase neutral wire are different, the V phase and W phase assemblies each have the phase lead as a winding start, a conductor with a different slot stride width is used to shift the inner circuit constituted with the third and fourth conductors of the plurality of slots to the adjacent slot and is wound twice so as to move the inner circuit through the second and third conductors of the plurality of slots to the outer circuit constituted with the first and second conductors of the plurality of slots, and a conductor with a different slot stride width is used to move the outer circuit to the adjacent slot and is wound twice so as to constitute a circuit having the end of winding at the phase neutral wire. FIG. 18 shows a plan table of each phase. For instance, the U phase has the slots No. 3 and 4 into which the four conductors of the inner circuit are inserted and the slots No. 4 and 5 into which the four conductors of the outer circuit are inserted. The conductors of the inner circuit and the outer circuit lie at positions different by one slot, and they become an apparently fractional-pitched winding.

Figure 11:
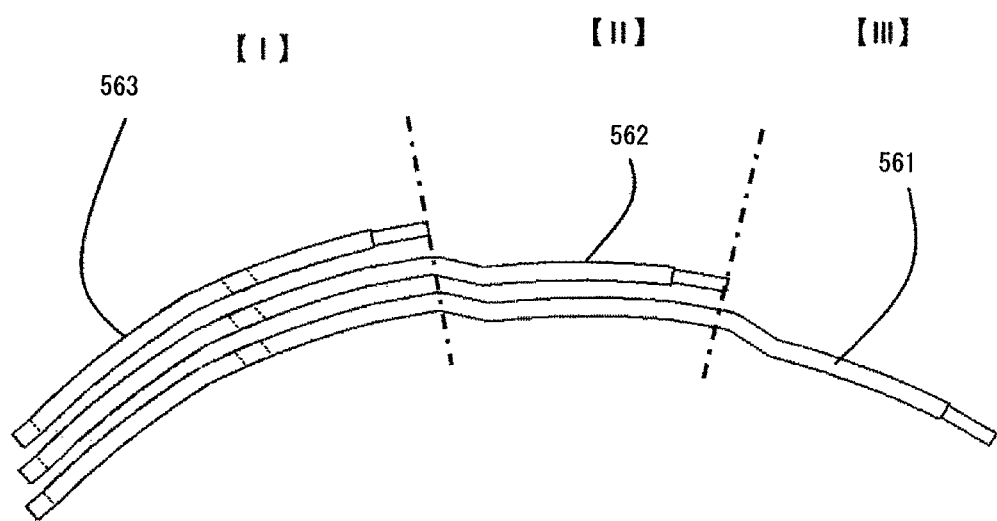
FIG. 11 illustrates the formed shape of a neutral wire A that constitutes an embodiment of the present invention.

FIG. 11 illustrates the formed or molded shape of the neutral wire A. The neutral wire A is constituted with the U1 phase neutral wire 561, which is the end of winding of the U1 phase, the V1 phase neutral wire 562, which is the end of winding of the V1 phase, and the W1 phase neutral wire 563, which is the end of winding of the W1 phase. Each of the neutral wires 561, 562, and 563 is supposed to be a conductor having been formed or molded into the final shape in advance so as to ensure insulation between the conductors and bent at an obtuse angle so as not to apply much pressure on insulation coating. Usually, three types of forming molds are required so as to form three types of neutral wires with different lengths into the final shape in advance. Here, the forming mold of the U1 phase neutral wire 561, which is the end of winding of the U1 phase, is divided into regions I, II, and III. In the region I, the shapes of a corresponding part of the neutral wire 561, a corresponding part of the neutral wire 562, and the neutral wire 563 are the same. In the region II, the shapes of a corresponding part of the neutral wire 561 and a corresponding part of the neutral wire 562 are the same. In the region III, there is a part of the neutral wire 561. As a result, three neutral wires with different lengths can be formed using only one forming mold. Thus, isolation between the conductors is ensured and high manufacturing workability is achieved by reducing the number of types of molds.

Figure 12:
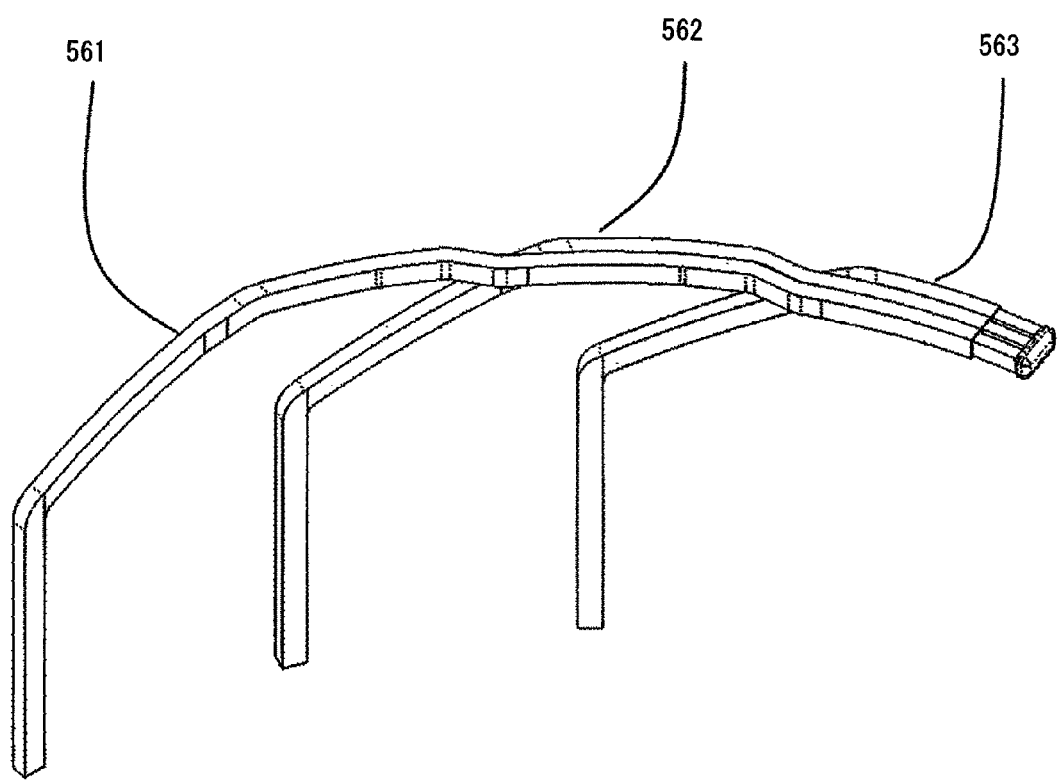
FIG. 12 shows an external view of a set of three neutral wires A that constitutes an embodiment of the present invention.

FIG. 12 shows an external view of a pair of three neutral wires A. The ends of the U1 phase neutral wire 561, the V1 phase neutral wire 562, and the W1 phase neutral wire 563 that have been formed into the final shape in advance are TIG-welded into a state of a subassembly of a neutral wire, which is a set of three neutral wires. As a result, isolation between the conductors is ensured and high manufacturing workability is achieved by reducing the number of types of the conductors inserted into the stator core.

Figure 13:
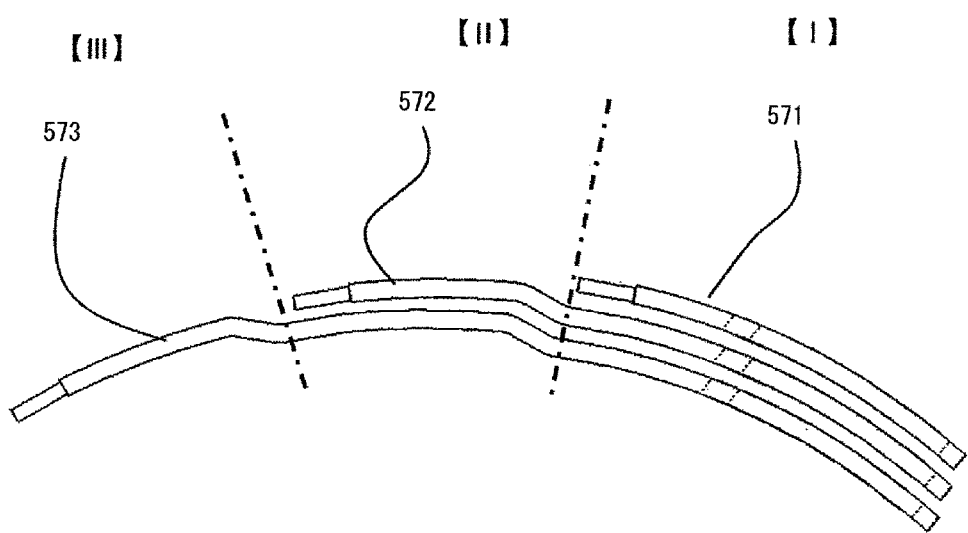
FIG. 13 illustrates the formed shape of a neutral wire B that constitutes an embodiment of the present invention.

FIG. 13 illustrates the formed or molded shape of the neutral wire B. The neutral wire B is constituted with the U2 phase neutral wire 571, which is the end of winding of the U2 phase, the V2 phase neutral wire 572, which is the end of winding of the V2 phase, and the W2 phase neutral wire 573, which is the end of winding of the W2 phase. Each of the neutral wires 571, 572, and 573 is supposed to be a conductor having been formed or molded into the final shape in advance so as to ensure insulation between the conductors and bent at an obtuse angle so as not to apply much pressure on insulation coating. Usually, three types of forming molds are required so as to form three types of neutral wires with different lengths into the final shape in advance. Here, the forming mold of the W2 phase neutral wire 573, which is the end of winding of the W2 phase, is divided into regions I, II, and III. In the region I, the shapes of a corresponding part of the neutral wire 573, a corresponding part of the neutral wire 572, and the neutral wire 571 are the same. In the region II, the shapes of a corresponding part of the neutral wire 573 and a corresponding part of the neutral wire 572 are the same. In the region III, there is a part of the neutral wire 573. As a result, three neutral wires with different lengths can be formed using only one forming mold. Thus, isolation between the conductors is ensured and high manufacturing workability is achieved by reducing the number of types of the molds.

Figure 14:
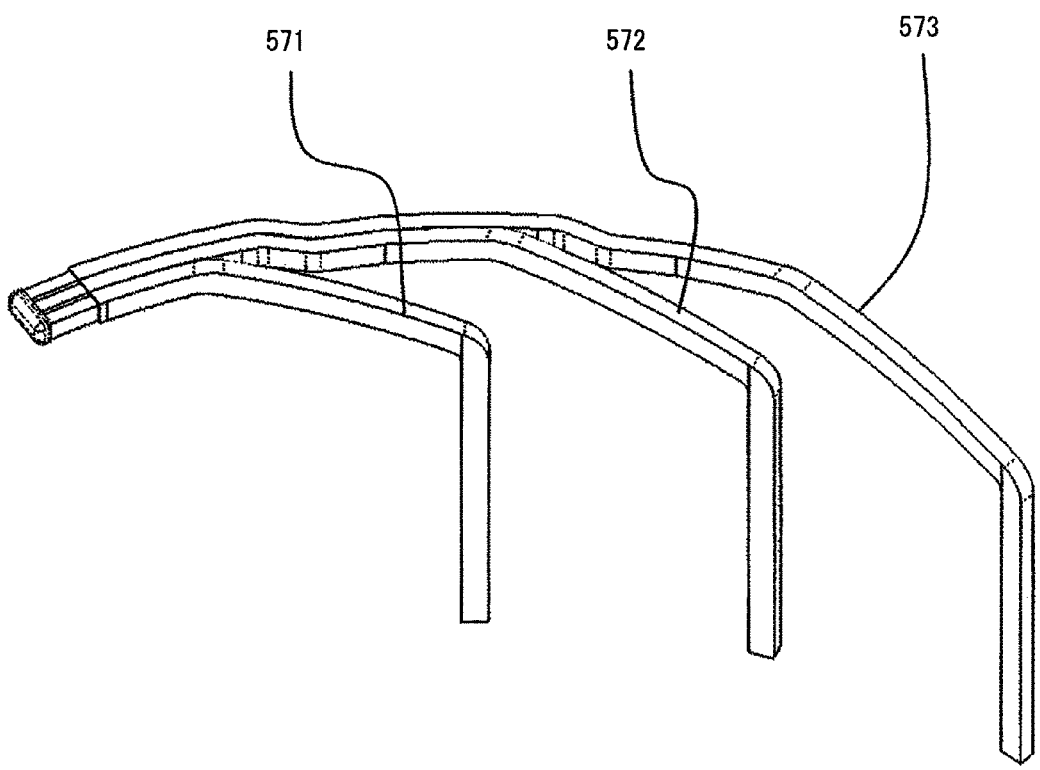
FIG. 14 shows an external view of a set of three neutral wires B that constitutes an embodiment of the present invention.

FIG. 14 shows an external view of a pair of three neutral wires B. The ends of the U2 phase neutral wire 571, the V2 phase neutral wire 572, and the W2 phase neutral wire 573 that have been formed into the final shape in advance are TIG-welded into a state of a subassembly of a neutral wire, which is a set of three neutral wires. As a result, isolation between the conductors is ensured and high manufacturing workability is achieved by reducing the number of types of the conductors inserted into the stator core.

Figure 15:
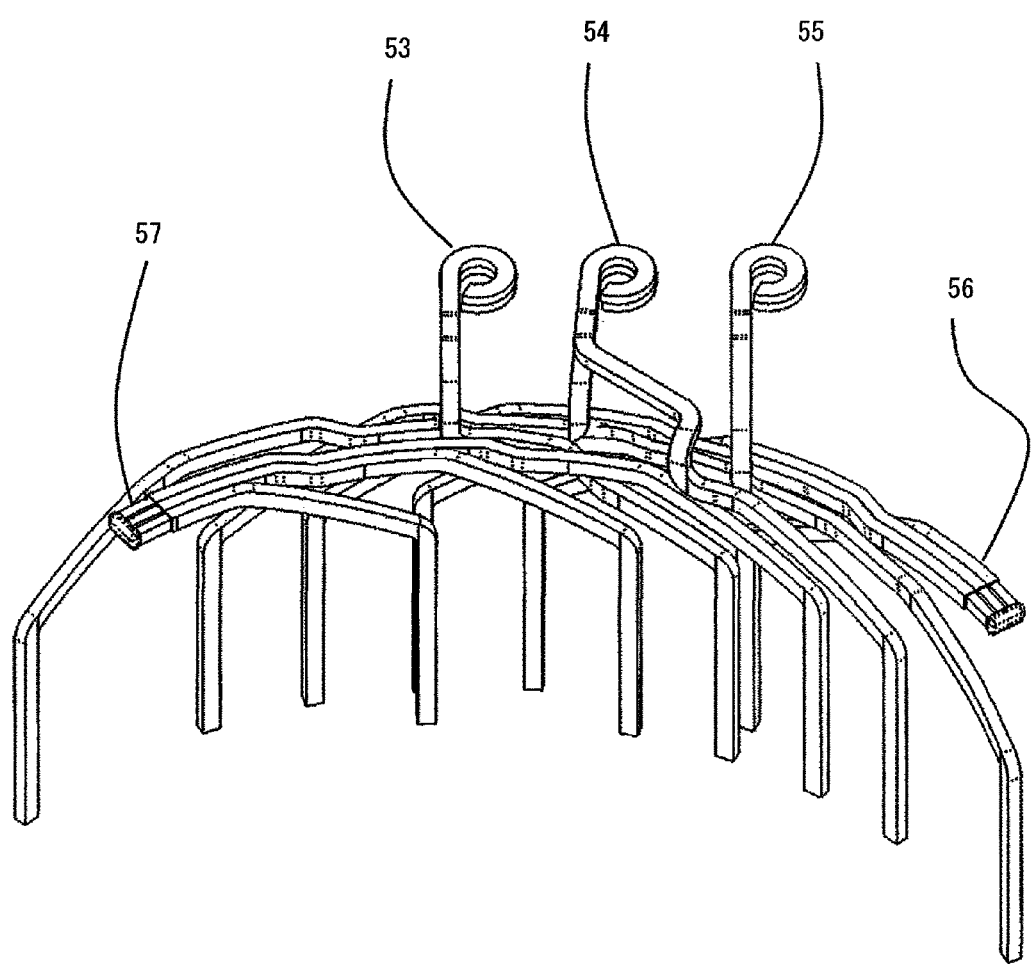
FIG. 15 shows an external view of neutral wires and lead wires of the stator that constitutes an embodiment of the present invention.

FIG. 15 shows an external view of neutral wires and lead wires of the stator 5. The U phase lead section 53, the V phase lead section 54, and the W phase lead section 55, which are the leads to be connected with the outside, are aligned in parallel in a position perpendicular to the axial direction, and the neutral point A56 and the neutral point B57 are disposed in the opposite direction circumferentially out of a range of the lead sections 53, 54, and 55. As a result, the region raised by leading the neutral point A56 and the neutral point B57 in the upper part of the coil end section is reduced so as to ensure a gap with the transmission section, and, even with the lead sections being concentrated into one position, a simple structure is achieved to ensure isolation between the conductors and high manufacturing workability.

—Embodiment 2—

Figure 16:
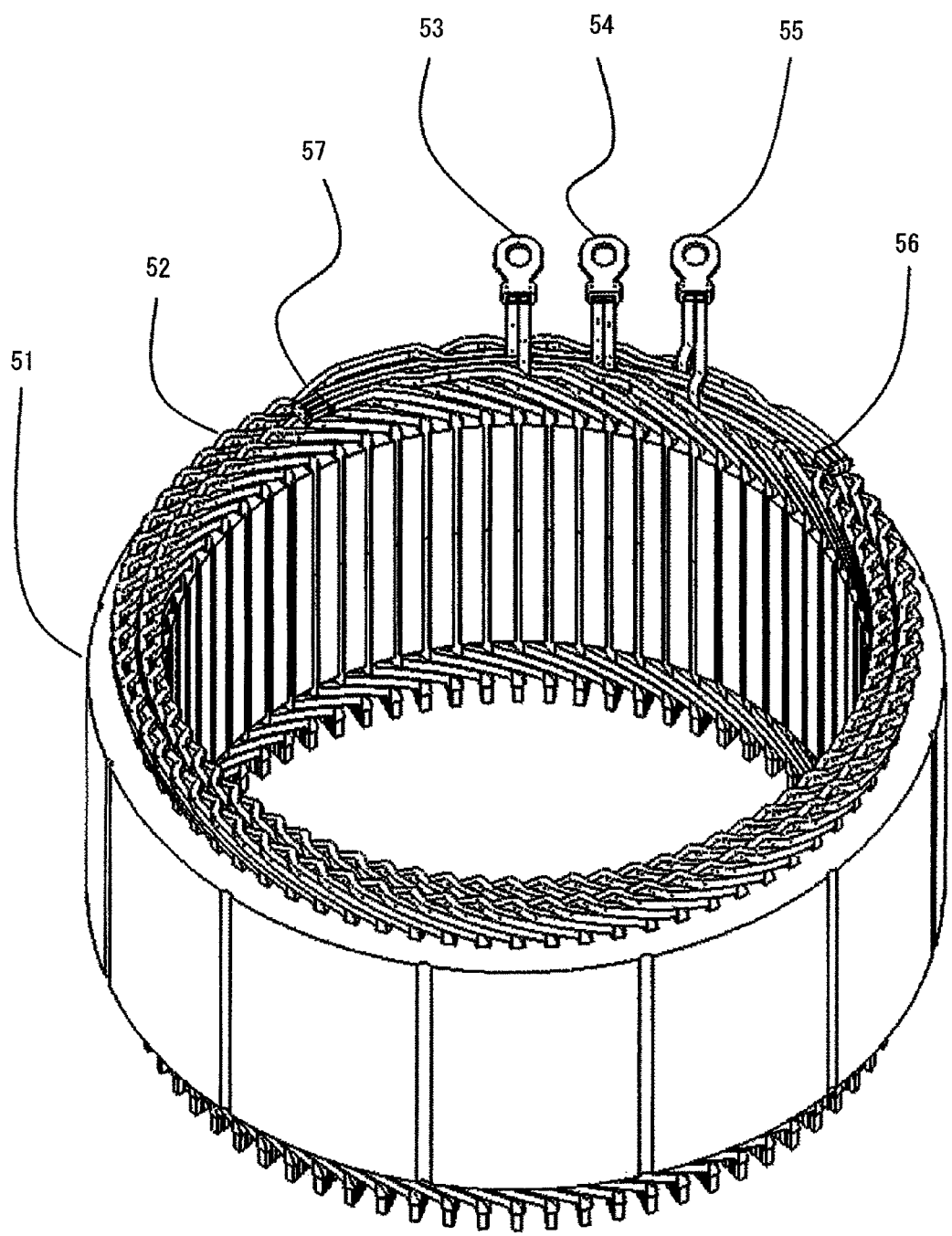
FIG. 16 shows an external view of the stator of the rotating electric machine that constitutes an embodiment of the present invention.

FIG. 16 shows an external view of the stator of the rotating electric machine according to the second embodiment of the present invention. The stator 5 includes the stator core 51 in which a plurality of slots are formed and a stator coil which is constituted with a plurality of conductors 52 stored in each of the plurality of slots. The stator 4, which includes a plurality of magnetic poles disposed so that their polarities alternate in the direction of rotation, is provided with respect to the stator 5 through a gap. The stator 5 of the rotating electric machine 3 is constituted by electrically connecting the plurality of the conductors 52 that are disposed in the plurality of the slots formed side by side and range astride a plurality of the slots corresponding to the plurality of magnetic poles. The stator 5 includes the U phase lead section 53, the V phase lead section 54, and the W phase lead section 55 to connect the neutral point A56 and the neutral point B57, which are provided in the upper part of the coil end section constituted with the plurality of conductors 52, with the outside.

Figure 17:
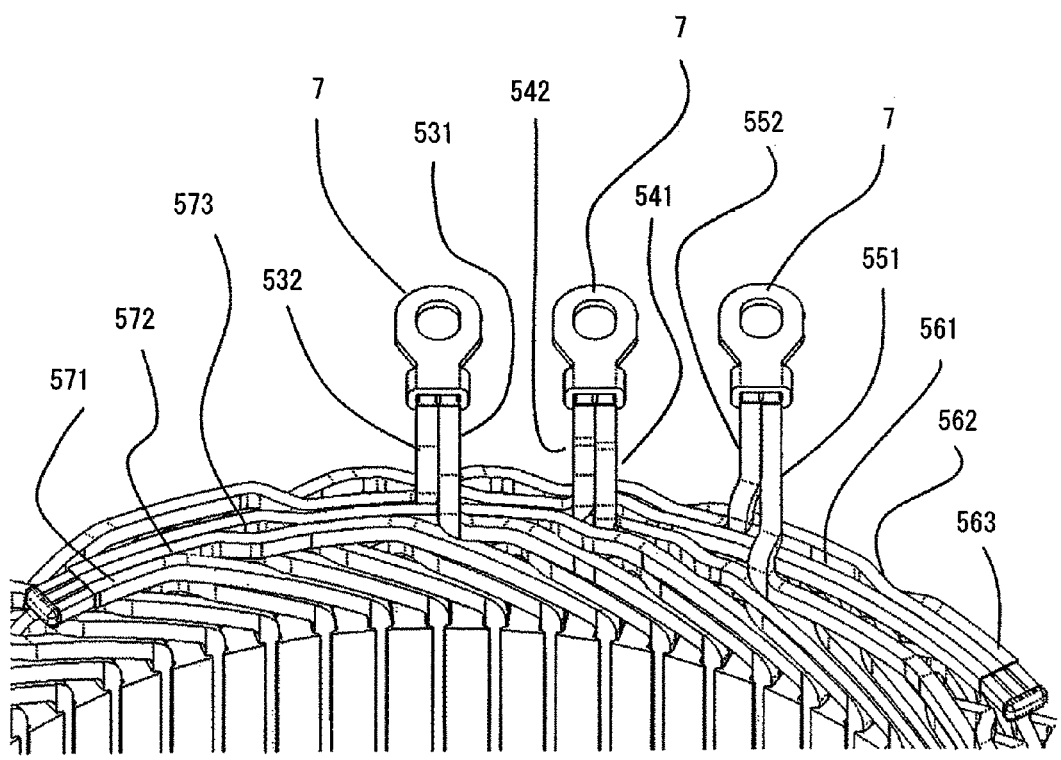
FIG. 17 shows an enlarged view of a lead section of the stator of the rotating electric machine that constitutes an embodiment of the present invention.

FIG. 17 shows an enlarged view of the lead section of the stator 5 of the rotating electric machine 3 that constitutes an embodiment of the present invention. Mainly, external-connection-side lead sections of a stator of an electric vehicle motor are aggregated into one position or location so as to connect with cables.

In the U phase lead section 53, the U1 phase lead 531, which is extended from the innermost slot of the stator core 51, and the U2 phase lead 532, which is extended from the outermost slot of the stator core 51, are aligned in a position perpendicular to the axial direction on the circumference of the stator core 51. A side surface of the U1 phase lead 531 and that of the U2 phase lead 532 are closely adhered so as to connect with a terminal 7.

In the V phase lead section 54, the V1 phase lead 541 and the V2 phase lead 542 are aligned in a position perpendicular to the axial direction on the circumference of the stator core 51. A side surface of the V1 phase lead 541 and that of the V2 phase lead 542 are closely adhered so as to connect with the terminal 7.

In the same manner, in the W phase lead section 55, the W1 phase lead 551 and the W2 phase lead 552 are aligned in a position perpendicular to the axial direction on the circumference of the stator core 51. A side surface of the W1 phase lead 551 and that of the W2 phase lead 552 are closely adhered so as to connect with the terminal 7.

In the U phase lead section 53 of the external-connection-side lead section the U1 phase lead 531 and the U2 phase lead 532 are aligned as a pair, in the V phase lead section 54 the V1 phase lead 541 and the V2 phase lead 542 are aligned as a pair, and in the W phase lead section 55 the W1 phase lead 551 and the W2 phase lead 552 are aligned as a pair, in parallel in a position perpendicular to the axial direction on the circumference of the stator core 51. A gap with the transmission section is ensured by reducing the region raised by leading the neutral point A56 and the neutral point B57 in the upper part of the coil end section. In order to do so, the neutral point A56 is disposed outside or the right side in FIG. 17 of the W1 phase lead 551 by routing the U1 phase neutral wire 561, the V1 phase neutral wire 562, and the W1 phase neutral wire 563 in the upper part of the coil end section of the plurality of conductors 52. The neutral point B57 is disposed outside or the left side in FIG. 17 of the U2 phase lead 532 by routing the U2 phase neutral wire 571, the V2 phase neutral wire 572, and the W2 phase neutral wire 573 in the upper part of the coil end section of the plurality of conductors 52.

As explained above, according to an embodiment of the present invention, a rotating electric machine and a manufacturing method thereof with high insulation and productivity can be achieved.

The above described embodiments are examples, and various modifications can be made without departing from the scope of the invention.

What is claimed is:

1. A rotating electric machine comprising:
   a rotor that comprises a plurality of magnetic poles, polarities of which are arranged to alternate circumferentially; and
   a stator, disposed with respect to the rotor through a rotary gap, that comprises a stator core in which a plurality of slots are formed circumferentially and a stator coil that is stored in the plurality of slots and ranges astride the slots corresponding to the plurality of magnetic poles outside an axial end section of the stator core, wherein:
   the stator coil comprises sets of a first stator coil and a second stator coil that is adjacent to the first stator coil in a slot in which the first stator coil is stored, with a number of the sets being the same as a number of phases, each of the first stator coil and the second stator coil having one end that is a lead section and another end that is a neutral point;

a plurality of the stator coils are arranged radially in layers in each slot, and the lead section of the first stator coil and the lead section of the second stator coil are connected with each other, with one of the lead sections of the first and second stator coils extending from an outermost layer of the slot and another of the lead sections extending from an innermost layer of the slot so that the connected lead sections of the first and second stator coils constitute an external connection terminal;

a conductor of the first stator coil extends from the slot to one circumferential side to form a neutral point and a conductor of the second stator coil extends from the slot to another circumferential side to form a neutral point;

the neutral points of the first stator coil are connected together and the neutral points of the second stator are connected together;

the neutral points of the first stator coil and the neutral points of the second stator coil are formed into shapes bent at obtuse angles;

the neutral points of the first stator coil and the neutral points of the second stator coil are disposed in opposite directions circumferentially in an upper part of the coil end section;

end sections of the neutral points of the first stator coil and end sections of the neutral points of the second stator coil are directed circumferentially;

a plurality of the conductors that form the neutral points of the first stator coil are aligned parallel in a radial direction in at least one portion;

a plurality of the conductors that form the neutral points of the second stator coil are aligned parallel in a radial direction in at least one portion; and both of the plurality of the conductors that form the neutral points of the first stator coil have at least one radially bent portion in the upper part of the coil end section.

2. The rotating electric machine according to claim 1, wherein:
the external connection terminal is disposed in a position perpendicular to an axial direction of the stator core on a circumference of the stator core.

3. The rotating electric machine according to claim 1, wherein:
the external connection terminals of each phase are aggregated in a range of a predetermined number of the slots of the stator core arranged circumferentially.

4. The rotating electric machine according to claim 1, wherein:
a conductor that constitutes the neutral point extends from a layer between the outermost layer and the innermost layer in the slot.

5. The rotating electric machine according to claim 1, wherein:
lengths of the conductors that form the neutral points are set and the conductors are molded in advance so that the neutral points of the conductors of the set lengths connect with each other in a same position.

6. The rotating electric machine according to claim 1, wherein:
the plurality of the stator coils are arranged in four layers in the slot;
each of the first stator coil and the second stator coil is constituted by an outer circuit including a first layer conductor and a second layer conductor in the slot, and an inner circuit including a third layer conductor and a fourth layer conductor in the slot; and
the first layer conductor and the second layer conductor are arranged in slots adjacent to each other in the outer circuit, and the third layer conductor and the fourth layer conductor are arranged in slots adjacent to each other in the inner circuit.

* * * * *